United States Patent
Tuusa

[11] Patent Number: 5,091,841
[45] Date of Patent: Feb. 25, 1992

[54] PROCEDURE FOR THE CONTROL OF FREQUENCY CONVERTER AND RECTIFIER/INVERTER BRIDGES, AND A MODULATOR UNIT DESIGNED FOR IMPLEMENTING THE PROCEDURE

[75] Inventor: Heikki J. Tuusa, Tampere, Finland

[73] Assignee: Kone Elevator GmbH, Baar, Switzerland

[21] Appl. No.: 460,785

[22] Filed: Jan. 4, 1990

[30] Foreign Application Priority Data

Mar. 6, 1989 [FI] Finland .................. 891057

[51] Int. Cl.$^5$ .......................................... H02M 3/335
[52] U.S. Cl. ........................................ 363/98; 363/41; 363/132
[58] Field of Search .................. 363/37, 41, 85, 89, 363/97-98, 127, 132

[56] References Cited

U.S. PATENT DOCUMENTS

| | | |
|---|---|---|
| 3,906,337 | 9/1975 | Depenbrock . |
| 4,617,675 | 10/1986 | Ashikaga et al. ............... 363/41 |
| 4,675,802 | 6/1987 | Sugimoto ........................ 363/41 |
| 4,723,201 | 2/1988 | Tanamachi et al. ............ 363/41 |
| 4,907,444 | 3/1990 | Tuusa . |

FOREIGN PATENT DOCUMENTS

401300 4/1978 Sweden .
401759 5/1978 Sweden .

*Primary Examiner*—Peter S. Wong
*Attorney, Agent, or Firm*—Sughrue, Mion, Zinn, Macpeak & Seas

[57] ABSTRACT

A procedure and apparatus for the control of solid-state switches in three-phase frequency converter and rectifier/inverter bridges is disclosed. Such control employs pulse width modulation. In this procedure, the modulation pulses of each phase are generated by comparing sinusoidal modulation references in an interval-by-interval manner to at least two triangular waves with a phase shift between them. The modulator unit for implementing the procedure incorporates one or more memory circuits storing the modulation reference curves, one or more D/A converters for converting the memory circuit outputs into analog form, and comparators for producing preliminary modulation pulses by comparing the sinusoidal modulation reference signals to at least two triangular waves shifted in phase relative to each other.

11 Claims, 5 Drawing Sheets

PROCEDURE FOR THE CONTROL OF FREQUENCY CONVERTER AND RECTIFIER/INVERTER BRIDGES, AND A MODULATOR UNIT DESIGNED FOR IMPLEMENTING THE PROCEDURE

BACKGROUND OF THE INVENTION

1. Field Of The Invention

The present invention relates to a procedure for the control of solid-state switches in three-phase frequency converter and rectifier/inverter bridges, said control employing pulse width modulation. The present invention also relates to a modulator unit designed for implementing that procedure.

2. Description Of Related Prior Art

A symmetric modulation procedure for the control of frequency converter and rectifier bridges is presented in IEEE Transactions on Industry Applications, Vol. IA-21, No. 5, Sep./Oct., 1985, in an article entitled "PWM control Techniques for Rectifier Filter Minimization", pp. 1206–1214, written by Phoivas D. Ziogas, Young-Goo Kang and Victor R. Stefanovic. The principle of said modulation procedure is based on the comparison of a non-continuous carrier wave of a given frequency and a sinusoidal modulation reference signal. During the middle 60° interval of each half-cycle of the sine wave, the modulation pulses are generated by applying a reference consisting of the sum of the modulation references for the other two symmetrical phases. The procedure of Ziogas et al only allows certain relationships between the frequency of the carrier and that of the fundamental wave ($n = k + 3$, $k = 1, 2, 3, \ldots$), and the modulation carrier needs to be synchronized with the modulation reference. For these reasons, the procedure of Ziogas et al is difficult to realize without modifications, especially in the low frequency region, and in particular if the carrier frequency is to be kept constant or within definite limits.

SUMMARY OF THE INVENTION

The object of the present invention is to eliminate the above-mentioned drawback and to modify the principle described above so as to render it suitable for use in demanding practical applications.

According to one aspect of the invention, in a procedure for the control of frequency converter and rectifier/inverter bridges, the modulation pulses of each phase are generated by comparing sinusoidal modulation references, or simplified references produced from them, in an interval-by-interval manner with at least two triangular waves with a phase shift between them.

According to a second aspect of the invention, a modulator unit for implementing such procedure, designed for the control of solid-state switches in three-phase frequency converter and rectifier/inverter bridges, said control employing pulse width modulation, incorporates one or more memory circuits storing the modulation reference curves, one or more D/A converters for converting the memory circuit outputs into analog form, comparators for producing the modulation pulses by comparing sinusoidal modulation reference signals with at least two triangular waves shifted in phase relative to each other, and a decoder circuit which produces the actual modulation pulses for different phases from a pattern of modulation pulses.

The procedure of the invention and the modulator unit implementing the procedure are particularly applicable in PWM rectifier bridges designed for use in elevator control systems. The procedure and the modulator unit can also be applied, without modification, in other types of converter bridges.

BRIEF DESCRIPTION OF THE DRAWINGS

An embodiment of the invention will now be described by way of example only and with reference to the accompanying drawings, in which.

DESCRIPTION OF PREFERRED EMBODIMENTS

Figure 1:
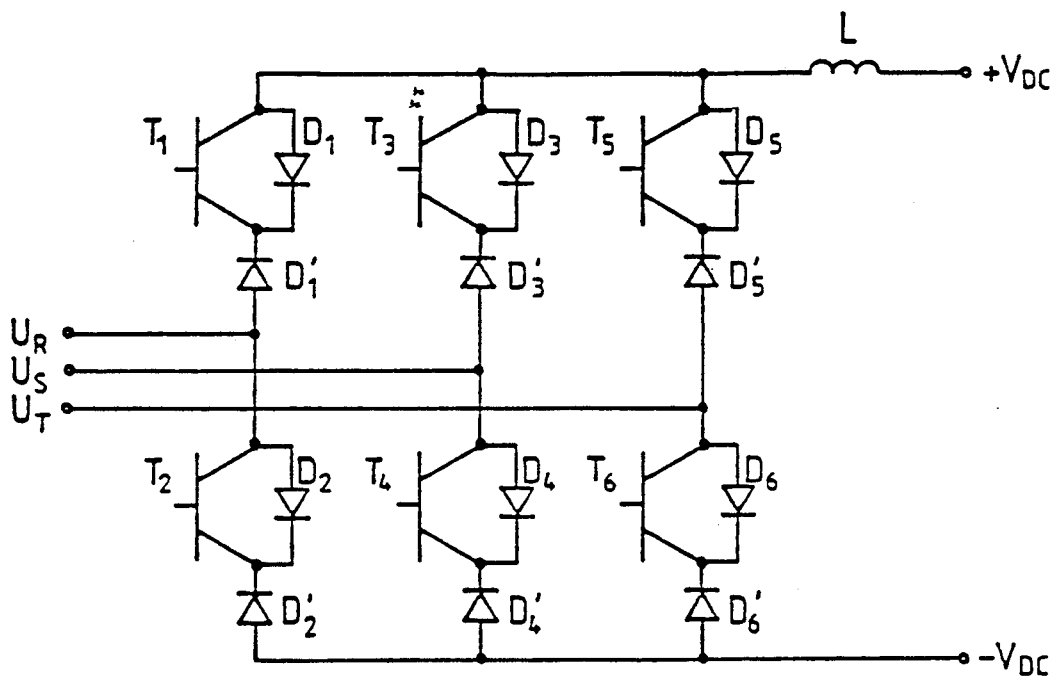
FIG. 1 shows a rectifier bridge.

The invention relates to the control of switching components used in three-phase frequency converter and rectifier bridges constructed as shown in FIG. 1. The bridge is connected to a three-phase mains supply in which the phase voltages are $U_R$, $U_S$ and $U_T$. The bridge consists of fully gate-controlled switched $T_1$–$T_6$, diodes $D_1$–$D_6$ incorporated in the controlled switches and connected in inverse-parallel with them, and further diodes $D'_1$–$D'_6$ connected in series with said inverse-parallel switch-and-diode circuits. In addition, the d.c. circuit, in which the voltages are $+V_{DC}$ and $-V_{DC}$, is provided with a smoothing choke L.

Figures 2A, 2B:
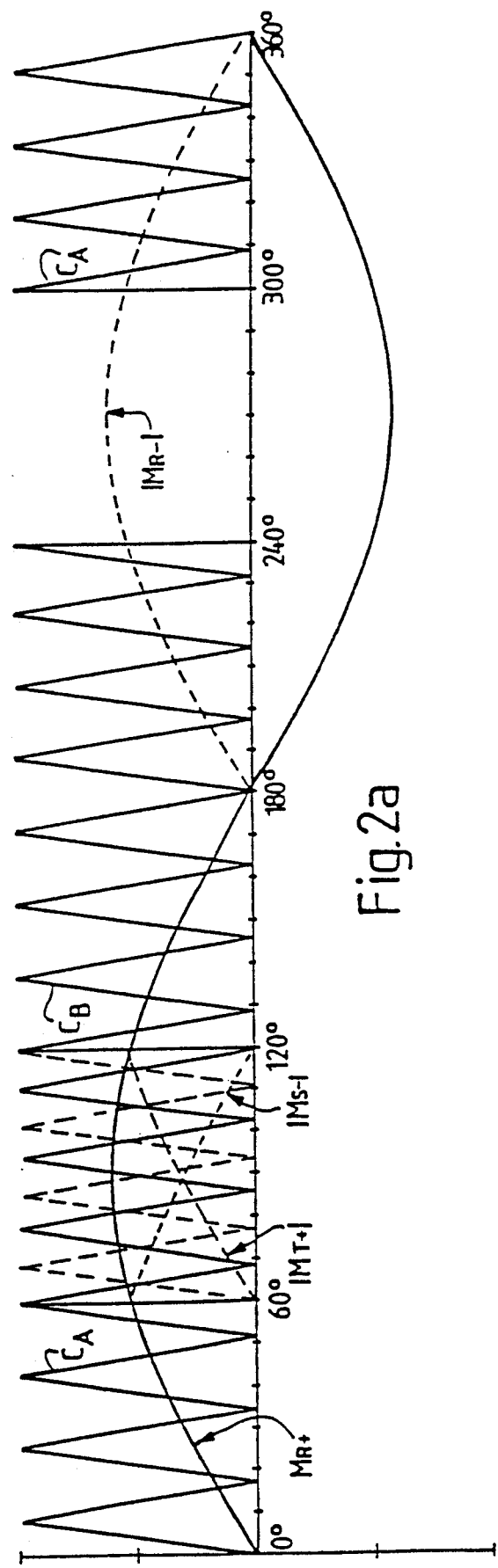
FIGS. 2a and 2b illustrate the principle of the modulation procedure of the invention.

The generation of modulation pulses by the procedures of the invention can be described with the aid of FIGS. 2a and 2b. The modulation pulses $P_R$ (FIG. 2b) for phase R are produced by using two continuous triangular carrier waves $C_A$ and $C_B$ having a 180° phase shift between them, and the rising and falling 60° edges or points of a sine wave (during the negative half-cycle, the absolute value) as follows (FIG. 2a);

0°–60°: Carrier $C_A$ and rising edge of sine wave $M_R+$;

60°–120°: Carrier $C_A$ and falling edge of sine wave $|M_S-|$, and carrier $C_B$ and rising edge of sine wave $|M_T-|$;

120°–180°: Carrier $C_B$ and falling edge of sine wave $M_R+$;

180°–240°: Carrier $C_B$ and rising edge of sine wave $|M_R-|$;

240°–300°: Carrier $C_A$ and rising edge of sine wave $M_T+$, and carrier $C_B$ and falling edge of sine wave $M_S+$;

300°–360°: Carrier $C_A$ and falling edge of sine wave $|M_R-|$.

In the other two phases, the modulation is performed in the same way except that the phase angles between the phases are taken into account. The modulation pulse pattern obtained by the procedure is of the same form as that shown in FIG. 2b.

Figure 3A:
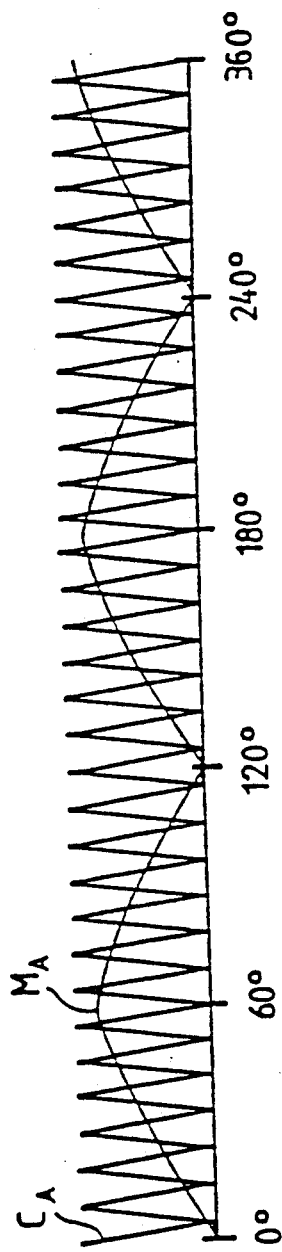
FIGS. 3a and 3b show pairs of simplified carrier modulation reference signals.
Figure 3B:
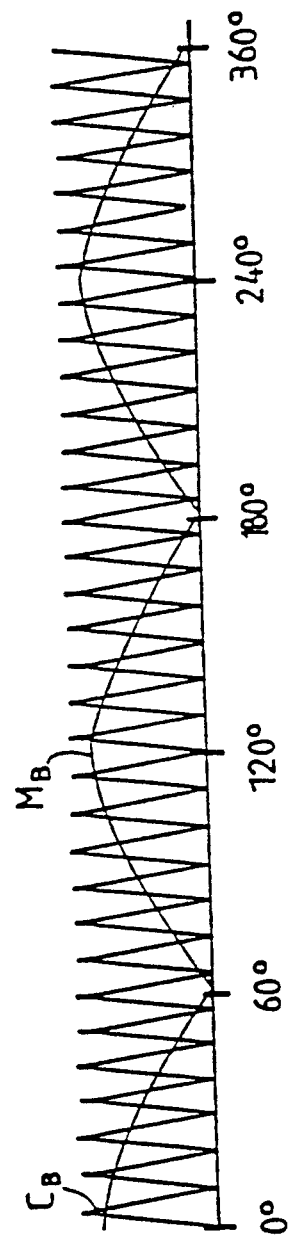

It can be seen from the modulation principle illustrated in FIGS. 2a and 2b that, for each 60° interval, both of the triangular waves and both a rising and a falling edge of the sine wave are used in the generation of the modulation pulses. Also, the rising and falling edge of the sine reference used with the same carrier changes within each interval. For this reason, all the modulation pulses required by each phase are obtained by using carrier and modulation reference pairs $C_A$ & $M_A$ and $C_B$ & $M_B$ as shown in FIGS. 3a and 3b. Thus, the modulation reference signals $M_A$ and $M_B$, which are composed of two parts of the same sine wave, the first part consisting of the 0°-60° interval and the second part of the 120°-180° interval, have a cycle length of 120° and a mutual phase shift of 60° as compared to the fundamental wave (FIG. 2a).

Since the use of carrier/modulation reference pairs as explained above produces the pulse patterns required for the modulation of all three phases, the pulses need only be directed to the right phases and switches within each 60° interval.

Figure 4A:
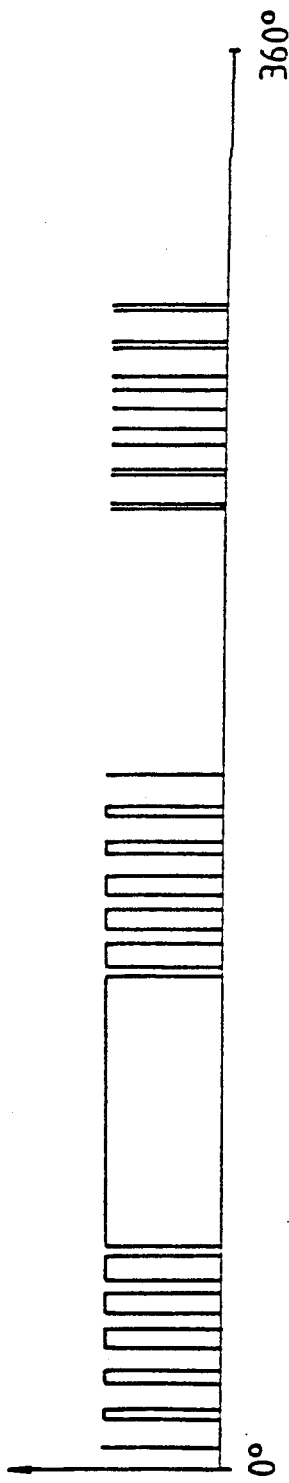
FIGS. 4a and 4b represent the signals controlling the switching components of a phase.
Figure 4B:
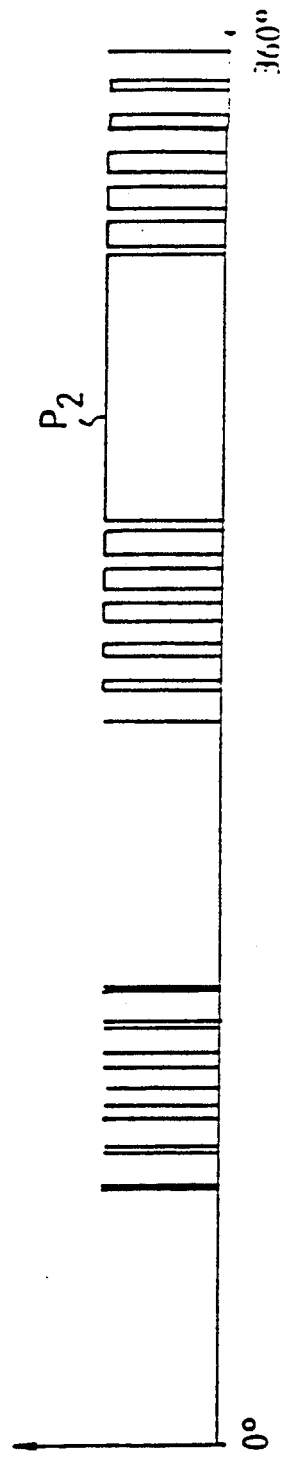

In the case of a current-controlled frequency converter and rectifier, a path through the bridge must always be provided for the current. For this reason, the switching components in one of the phases must be turned on when the normal modulation references are absent. The extra workload resulting from this zero-diode action of the bridge will be evenly distributed among all the switching components if the zero-diode function is alternated among the three phases in a rotary fashion. This can be implemented by applying a continuous control signal to the switching component during the middle 60° interval of the half-cycle of the sine wave and having the reverse component (diode) of the phase turned on when no modulation reference is present. To achieve this, the control signals $P_1$ and $P_2$ applied to the switching components of each phase must be of the form shown in FIGS. 4a and 4b.

Figure 5:
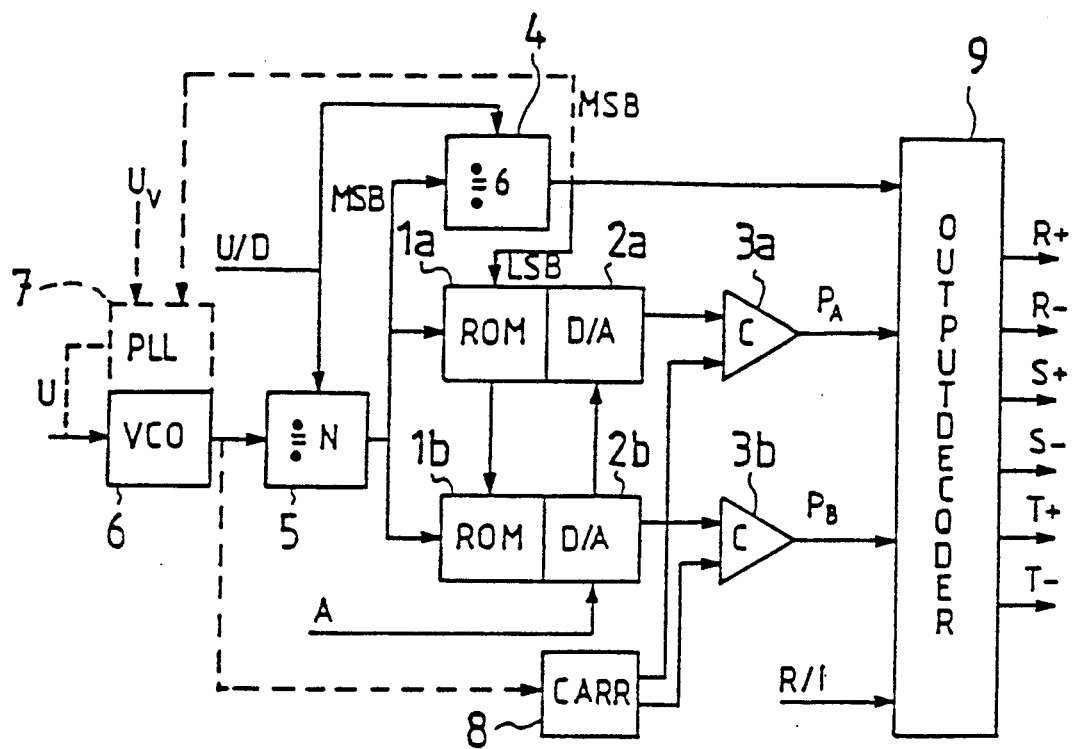
FIG. 5 represents the modulator circuit.

The modulator circuit is constructed as shown in FIG. 5. It uses two ROM circuits 1a and 1b storing the modulation reference curves shown in FIGS. 3a and 3b for the repeated 120° interval. Alternatively, the same reference curve can be stored in both ROM circuits, in which case the most significant bit in the address line of one of them is inverted. The outputs of the ROM circuits are converted into analog form by means of two multiplying D/A converters 2a and 2b, allowing amplitude adjustment of the modulation reference (input A). Alternatively, it is possible to use one ROM circuit together with a two-channel, multiplexed converter circuit, in which case the modulation reference curves are stored in the same memory circuit and the data are read sequentially into the converter channels.

The modulation references obtained from D/A converters 2a and 2b are compared to the corresponding carriers by comparators (C) 3a and 3b, thus producing the recurrent pulse patterns $P_A$ and $P_B$ needed for the modulation.

The most-significant bit (MSB) of the read address in the memory circuit is determined by the least-significant bit (LSB) of the output of the 6-divider 4, while the rest of the address is determined by an N-divider 5, whose ratio of division is determined by the desired number of points in the modulation reference curves. The rate at which the modulation reference curve is read is determined by a voltage-controlled oscillator (VCO) circuit 6, whose output frequency depends on the control voltage U. If it is desired that the control reference curves be read in a selected direction, e.g. when the direction of rotation of a motor fed by the bridge is changed, then it is necessary to use up/down-counting dividers, whose direction of operation is selectable (U/D).

The 6-divider 4 in the modulator circuit determines the 60° interval of the fundamental wave within which the circuit operates, thereby also determining the switching components to which the modulation pulses $P_A$ and $P_B$ are directed.

When necessary, the modulation reference curves can be synchronized e.g. with the mains phase voltage, in which case the bridge will have a unity power factor. This is achieved by feeding the inputs of a phase-locked loop (PLL) 7 with the phase voltage signal $U_V$ and the most significant bit (MSB) of the 6-divider 4. The output of the phase-locked loop determines the oscillator frequency in such manner that the comparison signals will fall into step. In this case, if it is required that the bridge should still be able to perform both rectifying and inverting functions, the order of operation of the switching components must be changed in the inversion situation by 180°. This is effected by using a rectification/inversion control signal R/I. Moreover, the output of the oscillator 6 can be utilized in the generation of the carriers by the carrier generator circuit (CARR) 8, in which case they, too, will be synchronized with the fundamental wave.

The modulation pulse patterns $P_A$ and $P_B$, the three-bit output of the 6-divider 4 and the R/I signal, along with other possible control signals, are fed into an output decoder 9 which produces the actual modulation references R+, R−, S+, S−, T+ and T− for the three phases. The decoding of the signals controlling the switching components of the bridge is accomplished using either a ROM circuit or four multiplexer circuits.

In the case of ROM-based decoding, the control and modulation signals are used directly for memory addressing. Each signal represents one bit in the address bus. The switching component control data corresponding to each combination of states are stored in the ROM, so that the control signals for the components are obtained, directly from the data bus in an ON/OFF form.

Figure 6:
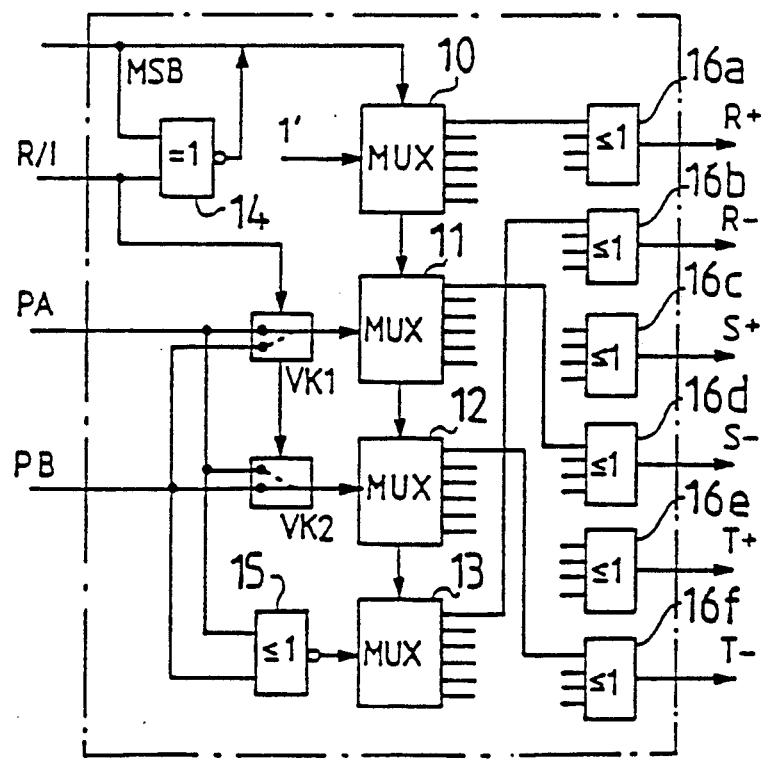
FIG. 6 illustrates the principle of multiplexer decoding.

The principle of multiplexer-based decoding is presented in FIG. 6. The decoder circuit has a separate multiplexer (MUX) 10–13 for each form of control pulse, i.e. for the modulated pulse trains $P_A$ and $P_B$, for the intervals required by the zero-diode function, during which the actual modulation pulse are absent, and for continuous control. The multiplexers select the switching components to which the various control pulses are directed at each instant.

The output of the 6-divider 4 determines the multiplexer output channels (each switching component having its own channel). In this manner, the form of the control signal applied to the components changes at 60° intervals in accordance with the modulation principle. The MUX circuit 13 taking care of the zero-diode function is fed by a NOR gate 15, which in turn is fed by the modulated pulse trains $P_A$ and $P_B$. The selection between rectifier/inverter action is made using two-way switches VK1 and VK2. When the R/I signal is in the high state, the most significant bit (MSB) in the address line of the MUX circuits 10–13 is passed directly through the inverting EXOR gate 14 and the pulse trains $P_A$ and $P_B$ go directly through the two-way switches VK1 and VK2 to MUX circuits 11 and 12. The modulation pulses R+, R−, S+, S−, T+ and T− obtained from OR gates 16a–16f, in which the control signals directed to the same component by different MUX circuits 10–13 are summed, are synchronized with the corresponding phase voltages and the bridge functions as a rectifier. When the R/I signal is low, the most significant bit is inverted by the EXOR gate 14, with the result that the control addresses are shifted by 180° and the pulse trains P_A and P_B are passed crosswise to MUX circuits 12 and 11. The modulation pulses R+, R−, S+, S−, T+ and T− are now shifted in phase by 180° relative to the corresponding phase voltages and the bridge is working as an inverter. The 6-divider in this case consists of a cascade of a 3-divider and a 2-divider.

It will now be obvious to those skilled in the art that embodiments of the invention are not restricted to the examples disclosed above, but may instead by varied within the scope of the following claims.

I claim:

1. A process for pulse-width modulation control of solid-state switches, used in three-phase frequency converter and rectifier/inverter bridges, each of said solid state switches having a reverse polarity component connected in inverse-parallel therewith, said process comprising the steps of:
    (a) producing two derived reference signals each of which has a first half consisting of the 0°–60° interval, and a second half consisting of the 120°–180° interval, of a cycle of a sinusoidal modulation reference signal, said derived reference signals having a cycle length of 120° and being displaced by 60° relative to each other;
    (b) obtaining modulation pulses for each phase by comparing said two derived reference signals, derived from modulation reference signals, to at least two out-of-phase triangular waveform type carrier signals; and
    (c) switching the solid state switches to be controlled at 60° intervals.

2. A process as defined in claim 1, wherein the number of said derived reference signals is the same as the number of said carrier signals.

3. A process for pulse-width modulation control of solid-state switches, used in three-phase frequency converter and rectifier/inverter bridges, each of said solid state switches having a reverse polarity component connected in inverse-parallel therewith, said process comprising the steps of:
    (a) producing two derived reference signals each of which has a first half consisting of the 0°–60° interval, and a second half consisting of the 120°–180° interval, of a cycle length of a sinusoidal modulation reference signal, said derived reference signals having a cycle length of 120° and being displaced by 60° relative to each other;
    (b) obtaining modulation pulses for each phase by comparing said two derived reference signals, derived from modulation reference signals, to at least two out-of-phase triangular waveform type carrier signals;
    (c) switching the solid state switches to be controlled at 60° intervals; and
    (d) implementing a zero-diode function by applying a continuous control signal in place of said modulation pulses to each solid state switch during a middle 60° interval of each cycle of said modulation pulses, while said reverse polarity component is turned on.

4. A process as claimed in claim 3, further comprising the step of alternating a zero-diode function among the three phases in a rotary fashion.

5. A modulator unit for controlling with pulse width modulation solid-state switches used in three-phase frequency converter and rectifier/inverter bridges, each of said solid state switches having a reverse polarity component connected in inverse-parallel therewith, said unit comprising:
    at least a first memory circuit for storing modulation reference signals in a digital form;
    at least two D/A converters for converting an output of said memory circuit to an analog signal;
    at least two comparators each generating a pattern of modulation pulses by comparing said modulation reference signals to at least two out-of-phase triangular waveform type signals;
    an output decoder circuit for producing the modulation pulses for each phase from said pattern of modulation pulses; and
    an oscillator for generating said two out-of-phase triangular waveform type signals.

6. A modulator unit as claimed in claim 5, further comprising a plurality of multiplying converters for adjusting the amplitude of said modulation reference signals.

7. A modulator unit as claimed in claim 5, further comprising:
    six-divider means for dividing said sinusoidal modulator reference signal 360° cycle into six equal intervals, wherein the least-significant bit of an output of said divider means represents the most-significant bit of an address of said stored modulation reference signals in said memory circuit;
    an N-divider means which provides the remaining bits of said address and whose ratio of division is selected to give a desired rate of reading of a stored modulation reference signal; and
    a voltage-controlled oscillator circuit for determining a basic rate at which said stored modulation reference signal is read.

8. A modulator unit as claimed in claim 5, further comprising a plurality of up/down-counting divider means whose direction of operation is selectable to allow selection of the direction in which said stored modulation reference signals are read.

9. A modulator unit as claimed in claim 5, further comprising a phase-locked loop circuit means for enabling said modulation reference signals to be synchronized with the mains phase voltage by applying at an input of said phase-locked loop means a mains phase voltage and the most-significant bit of the output of said six-divider means, so that the output of said phase-locked loop circuit means changes the frequency of said oscillator in such manner that said two out-of-phase triangular waveform type signals vary in steps.

10. A modulator unit as claimed in claim 5, wherein said output decoder circuit comprises a second memory storing said modulation pulses for each phase and control signals for solid state switches, wherein a first and a second control signal and said patterns of modulation pulses each represent an address bit and are directly used for addressing said memory for reading said control signals for solid state switches.

11. A modulator unit as claimed in claim 5, wherein said output decoder circuit comprises:
    a first and a second multiplexer for processing said pattern of modulation pulses;
    a third multiplexer for superposing a first control signal in the intervals when zero-diode function is required;
    a fourth multiplexer for generating modulated pulse trains for the intervals where zero-diode function is required;

two-way switches for directing said pulse trains to the multiplexers by selecting either a rectifying or an inverting function according to a second control signal; and OR gate means for processing output signals provided by said first, second, third and fourth multiplexers to obtain said control signals for said solid state switches.

* * * * *